United States Patent [19]

Morita et al.

[11] Patent Number: 4,663,397
[45] Date of Patent: May 5, 1987

[54] THERMOSETTING RESIN COMPOSITION

[75] Inventors: Yoshitsugu Morita; Akihiko Shirahata, both of Chiba, Japan

[73] Assignee: Toray Silicone Co., Ltd., Tokyo, Japan

[21] Appl. No.: 843,482

[22] Filed: Mar. 24, 1986

[30] Foreign Application Priority Data

Mar. 29, 1985 [JP] Japan .................................. 60-67947

[51] Int. Cl.⁴ ............................................ C08G 60/00
[52] U.S. Cl. .................................... 525/398; 525/106; 525/410; 525/431; 525/446; 525/476; 525/472; 525/474; 525/477
[58] Field of Search ............... 525/477, 474, 398, 106, 525/472, 431, 446, 476, 410

[56] References Cited

U.S. PATENT DOCUMENTS

| | | | |
|---|---|---|---|
| 4,087,478 | 5/1978 | Keil | 525/477 |
| 4,388,449 | 6/1983 | Bonnet et al. | 525/477 |
| 4,537,829 | 8/1985 | Blizzard et al. | 525/477 |
| 4,604,435 | 8/1986 | Koshii et al. | 525/476 |

FOREIGN PATENT DOCUMENTS 48-25739  7/1973  Japan .
53-14643  2/1977  Japan .
52-36534  8/1977  Japan .

*Primary Examiner*—Melvyn I. Marquis
*Attorney, Agent, or Firm*—Robert Spector

[57] ABSTRACT

Thermosetting resin compositions of the present invention comprises a thermosetting resin and a specified class of cured polyorganosiloxane resins dispersed as extremely fine particles in the thermosetting resin. Moldings and other shaped articles prepared using these compositions are flexible and exhibit small coefficients of thermal expansion and low shrinkage during molding.

10 Claims, No Drawings

THERMOSETTING RESIN COMPOSITION

BACKGROUND OF THE INVENTION

1. Field of the Invention

The present invention relates to thermosetting resin compositions and, more particularly, to thermosetting resin compositions yielding flexible cured products exhibiting both a small coefficient of thermal expansion and a small degree of mold shrinkage.

2. Description of the Prior Art

Thermosetting resin compositions have excellent electrical properties, including dielectric properties, volume resistivity and insulation breakdown strength, and excellent mechanical properties such as flexural strength, compressive strength and impact strength. These resins are therefore useful insulating materials for electric or electronic parts that are fabricated by a variety of methods such as transfer molding, injection molding, potting, casting, powder coating, immersion coating and dipping.

Thermosetting resins are generally rigid resins. The coefficient of thermal expansion and shrinkage following molding exhibited by these resins are generally different from that of the electric or electronic part they protect. Electric and electronic part elements have relatively small coefficients of thermal expansion or low shrinkages while these values for the resins are relatively large. These large differences in expansion and shrinkage between the two materials generates excessive internal stress in the element or other structural material of the electric or electronic part after sealing, aftercure or subsequent thermal hysteresis. The stress may cause the part to malfunction or break. In addition, these differences in coefficients of thermal expansion or shrinkages may cause the thermosetting resin itself to crack or may cause voids between the electric/electronic part and the resin. The coated part is susceptible to deterioration when water or other material invades this void.

Although not directed specifically at improving the coefficient of thermal expansion or the shrinkage of molded thermosetting resins, there have been efforts to improve the properties of these materials. For example, Japanese Patent No. 52-36534[77-36534] describes an improvement in the lubricity of the surface of resin moldings by including a polyorganosilsesquioxane powder in the moldable composition. Japanese Kokai [Laid Open] Patent Publication No. 52-14643[77-14643] teaches increasing the wear resistance of synthetic resins with respect to metals by using as the filler a finely divided cured material composed principally of a polyorganosiloxane and an inorganic filler. Japanese Kokai [Laid Open] Patent Publication No. 48-25739 discloses adding cured silicone rubber in powder form to an epoxy resin. None of these methods provides an adequate improvement in the coefficient of thermal expansion, the shrinkage after molding or the flexural modulus of the cured resin.

Japanese Kokai Patent Publication No. 58-219218[83-219218] describes a method conceived by the present inventors to solve the above-described shortcomings whereby a finely divided cured elastomeric material containing at least 10 wt. % of a straight-chain siloxane fraction is blended into the thermosetting resin. The problem with this method is that it is not necessarily easy to finely grind the cured elastomeric material. In Japanese Kokai Patent Publication No. 59-96122[84-96122], the present inventors propose overcoming the disadvantages of prior art methods by using as the additive spherical particles of a material that cures into an elastomeric material. The particles are produced by spraying a curable composition in the form of spherical particles. This method is quite effective, however, the cost of the cured particles is high due to the requirement for a plant to produce them.

An objective of the present invention is to provide a thermosetting resin composition with good fluidity during molding, and which is easily released from a mold without soiling of the metal molds or exudation of a liquid onto the surface of the cured material. The cured materials exhibit good flexibility, a small coefficient of thermal expansion and a low shrinkage during molding.

SUMMARY OF THE INVENTION

The objectives of this invention are achieved by dispersing a very finely divided, cured polyorganosiloxane resin of specified composition into the thermosetting resin. The cured resin is readily ground or pulverized to produce very fine particles. The particles have an excellent affinity for the thermosetting resin and can be homogeneously dispersed in the composition.

DETAILED DESCRIPTION OF THE INVENTION

This invention provides a curable, thermosetting resin composition comprising (a) 100 parts by weight of a curable organic thermosetting resin, and (b) from 1 to 100 parts by weight of a finely divided, cured polyorganosiloxane resin wherein at least 90 weight percent of said polyorganosiloxane resin consists essentially of $R^1R^2R^3SiO_{0.5}$ units and $R^4SiO_{1.5}$ units and any remainder consists essentially of at least one member selected from the group consisting of $R^5R^6SiO$ units and $SiO_{4/2}$ units, where $R^1$, $R^2$, $R^3$, $R^4$, $R^5$, and $R^6$ are individually selected from hydrogen and monovalent hydrocarbon radicals, and the molar ratio of $R^1R^2R^3SiO_{0.5}$ units to $R^4SiO_{0.5}$ units is from 0.1 to 3.

The thermosetting resin comprising ingredient (a) is the base material of the present composition and contains at least one member from the known classes of organic thermosetting resins. These classes include, but are not limited to phenolic resins, formaldehyde resins, xylene resins, xylene-formaldehyde resins, ketone-formaldehyde resins, furan resins, urea resins, imide resins, melamine resins, alkyd resins, unsaturated polyester resins, aniline resins, sulfoamide resins, silicone resins and epoxy resins. Copolymers derived from 2 or more different resins are included within the definition of ingredient (a). Ingredient (a) can be a single resin or a mixture of 2 or more resins.

The cured polyorganosiloxane resin referred to herein as ingredient (b) is readily pulverized and imparts relatively small coefficient of thermal expansion and a low shrinkage following molding to cured products obtained from the present composition.

The combined weights of $R^1R^2R^3SiO_{0.5}$ units and $R^4SiO_{0.5}$ units exceeds 90 percent of the weight of the cured ingredient (b). The remaining 0 to 10 weight percent can be $R^5R^6SiO$ units, $SiO_{4/2}$ units, or an organic resin other than a polyorganosiloxane. Any of the $R^5R^6SiO$ units can be present as linear polydiorganosiloxane blocks having a degree of polymerization of ten or less.

The silicon-bonded radicals represented by $R^1$-$R^6$ in the preceding formulae are individually selected from hydrogen and monovalent hydrocarbon radicals. The hydrocarbon radicals can be substituted or unsubstituted and include, but are not limited to alkyl such as methyl, ethyl, propyl and octyl; cycloalkyl radicals such as cyclohexyl; akenyl radicals such as vinyl and allyl; aryl radicals such as phenyl and xylyl; aralkyl radicals such as phenylethyl; halogenated monovalent hydrocarbon radicals such as γ-chloropropyl and 3,3,3-trifluoropropyl and monovalent hydrocarbon radicals substituted by epoxy, amino, hydroxyl, carboxyl, carboxylate ester and/or mercapto groups. The radicals represented by $R^1$-$R^6$ are preferably mainly methyl based on the availability of the corresponding intermediates used to prepare the resin. Radicals such as ethyl, vinyl and/or phenyl radicals are frequently included in ingredient (b) in addition to methyl.

Ingredient (b) can be prepared using any of the known methods for obtaining polyorganosiloxane resins. For example, a mixture containing at least one triorganohalosilane, triorganoalkoxysilane and/or hexaorganodisiloxane that, when hydrolyzed, yields units of the general formula $R^1R^2R^3SiO_{0.5}$ is hydrolyzed and condensed in the presence of at least one organotrihalosilane or organotrialkoxysilane that upon hydrolysis yields $R^4SiO_{1.5}$ units. The molar ratio of reactants in the reaction mixture is such as will provide a molar ratio of $R^1R^2R^3SiO_{1/5}$ units to $R^4SiO_{1.5}$ units of from 0.1 to 3 in the cured resin. At least a portion of the hydroxyl or alkoxy groups present in the starting materials and/or intermediate hydrolysis products can be present in the final cured resin.

The reaction mixture for preparing ingredient (b) can contain various optional reactants, including at least one diorganodihalosilane, diorganodialkoxysilane or a polydiorganosiloxane that is terminated with hydrolyzable groups and exhibits a degree of polymerization of from 10 to 1000. The units provided by these reactants in the cured resin correspond to the formula $R^5R^6SiO$.

Other optional reactants for preparing ingredient (b) include at least one tetrahalosilane, alkyl silicate or polyalkylsilicate, any of which will produce $SiO_{4/2}$ units in the cured resin.

The total amount of optional reactants that can be present in the reaction mixture for ingredient (b) is such that the total weight of the units produced upon curing of these reactants constitutes less than 10 percent by weight of ingredient (b).

The polyorganosiloxane resins referred to herein as ingredient (b) can contain block copolymers of (1) a polyorganosiloxane resin containing the units specified in the preceding portion of the present specification pertaining to ingredient (b), and (2) an organic resin. The organic resin portion of these block copolymers can be any of the known thermoplastic or thermosetting types. These block copolymers can comprise up to 10 percent by weight of ingredient (b).

The polyorganosiloxane resin, ingredient (b), can be prepared by an addition reaction in the presence of a platinum-type catalyst; by a condensation reaction, which includes dehydration, dehydrogenation, alcohol liberation, deoximation, deamination, deamidation, decarboxylation and the liberation of ketone; by heating the uncured resin in the presence of organoperoxide; or by exposing the resin to γ-radiation, ultraviolet radiation or an electron beam.

The cured polyorganosiloxane resin, ingredient (b), must be pulverized in order to be dispersed in the form of extremely fine particles into ingredient (a). Unlike rubbery materials, the cured resin that constitutes component (b) is relatively easy to pulverize and usually can be ground in a mortar. When large quantities of this cured product are to be pulverized, this is readily accomplished using any of the known commercially available pulverizers. Spherically shaped resin particles that have been spray-cured by the method described in Japanese Kokai Patent No. 59-96122[84-96122] can also be employed as ingredient (b). While using the spherical particles is undesirable from the standpoint of cost, this material is superior to the finely ground material from the standpoint of its effect on the properties of the present compositions following curing.

The particle size of ingredient (b) cannot be unconditionally specified because it depends on the desired application of the thermosetting resin composition. The average particle size is generally no more than one millimeter. An average particle size of up to 200 microns is preferred.

The present compositions contain from 1 to 100 parts by weight of ingredient (b) per 100 parts of ingredient (a). A concentration of from 5 to 50 parts by weight is preferred. When too little of ingredient (b) is present, the effect of its addition may not always be apparent. When this quantity exceeds 100 weight parts, the physical properties of the unmodified thermosetting resin, ingredient (a), may be adversely affected.

In addition to ingredients (a) and (b), the composition of the present invention contains a curing agent for ingredient (a). These curing agents are known in the art, and include, but are not limited to, acid anhydride curing agents such as phthalic anhydride, pyromellitic anhydride, tetrahydrophthalic anhydride, hexahydrophthalic anhydride, succinic anhydride and behzophenonetetracarboxylic anhydride; amine curing agents such as dicyandiamide, diaminophenylmethane, diaminodiphenyl sulfone, metaphenylenediamine, bis(3-methyl-4-aminophenyl)methane and bis(4-aminocyclohexyl)methane and phenol novolac curing agents. The choice of an appropriate curing agent is based on the type of thermosetting resin used as ingredient (a). The quantity of curing agent present cannot be unconditionally specified because this will also be dependent upon the type of curing agent used. In addition to the curing agent, a curing accelerator can also be present. Typical curing accelerators include imidazoles, tertiary amines and complexes of metals such as aluminum.

In addition to the ingredients described hereinbefore, the present curable compositions can contain additives that include, but are not limited to, internal release agents known in the art such as fatty acid metal salts, ester waxes and liquid polyorganosiloxanes; inorganic fillers such as fumed silica, fused silica, crystalline silica, hydrated alumina, talc, diatomaceous earth, mica, asbestos, calcium carbonate and glass fibers; flame retardants such as antimony oxide, halogen compounds and phosphorus compounds; silane coupling agents and pigments. These additives can be added to either ingredient (a), (b), or to both ingredients prior to blending the two ingredients together. Alternatively, the additives are added when ingredients (a) and (b) are combined. The amount of inorganic additive will be dependent upon the specific additive and its purpose, and is generally from 5 to 1000 parts by weight per 100 weight parts of ingredient (a).

The present curable compositions are particularly useful for the production of moldings which must have precise dimensions. They are also quite useful as sealing agents, casting agents, coating agents, or powder coating materials for various electric and electronic parts such as transistors, integrated circuits, diodes, thermistors, transformer coils and resistors.

The following examples disclose preferred compositions of this invention. Comparative examples are also provided to demonstrate the superior properties of cured materials prepared using the present compositions relative to similar compositions of the prior art. In all of the examples, "parts" refers to parts by weight and all viscosities were measured at 25° C. The examples should not be interpreted as limiting the scope of the accompanying claims.

Various properties of the cured moldings were measured using the following specifications or methods.

(1) Coefficient of thermal expansion: the sample is postcured at 180° C. for 5 hours and measured by the method of ASTM-D696.
(2) Flexural modulus: measured by the flexural test method in accordance with Japanese Industry Standard (JIS)-K6911.
(3) Mold shrinkage: after molding in a metal mold, the cured product is then cooled to room temperature and measured by the method of JIS-K6911.
(4) Shrinkage after postcuring: the cured product of item (3) is postcured under the conditions described in each example, cooled to room temperature and then measured by the method of JIS-K6911.
(5) Scanning Electron Microscope (SEM) observations: the fracture surface of the test piece ruptured in item (2) is inspected using an electron microscope in order to determine the presence or absence of voids, which reflects the affinity (tight bonding) of ingredient (b) or the thermosetting resin, ingredient (a).

Production of Cured Powder A 100 parts of a polyorganosiloxane resin containing 35 mol percent $(CH_3)_3SiO_{0.5}$ units, 63 mol percent $CH_3SiO_{1.5}$ units, 2 mol percent $(CH_3)_2(CH_2=CH)SiO_{0.5}$ units, and exhibiting a viscosity of 0.35 Pa.s was mixed to homogeneity with 3 parts of a polymethylhydrogensiloxane exhibiting a viscosity of 0.05 Pa.s as the crosslinker, an isopropyl alcohol solution of chloroplatinic acid containing 10 ppm as platinum metal based on the total weight, and 0.1 part 3-methyl-1-butyn-3-ol. The composition (I) was cured by heating in a hot air circulation oven at 100° C. for 3 hours to prepare an ingredient (b) of this invention. This cured material was easily ground to a fine powder using a mortar and passed through a 100-mesh sieve. The powder passing through the 100-mesh sieve was designated as cured powder A.

Production of Cured Powder B

The curable polyorganosiloxane composition (I) produced as described in the preceding paragraph pertaining to cured powder A was sprayed from a nozzle into a nitrogen atmosphere at 200° C. to prepare spherical particles of cured material having an average particle size of about 20 μm, designated as cured powder B.

Production of Cured Powder C 95 parts of a polyorganosiloxane resin containing 35 mol percent of $(CH_3)_3SiO_{0.5}$ units, 51 mol percent of $CH_3SiO_{1.5}$ units, 12 mol percent of $(CH_3)_2(C_6H_5)SiO_{0.5}$ units, 2 mol percent of $(CH_3)_2(CH_2=CH)SiO_{0.5}$ units and exhibiting a viscosity of 0.06 Pa.s was mixed, with 5 parts of a vinyl-containing polyorganosiloxane of the average formula

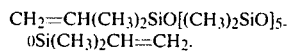
$CH_2=CH(CH_3)_2SiO[(CH_3)_2SiO]_5$-
$OSi(CH_3)_2CH=CH_2$.

The resulting mixture was mixed to homogeneity with 5 parts of a polymethylhydrogensiloxane of the average formula

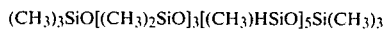
$(CH_3)_3SiO[(CH_3)_2SiO]_3[(CH_3)HSiO]_5Si(CH_3)_3$ as the crosslinker, an isopropyl alcohol solution of chloroplatinic acid containing 10 ppm platinum metal and 0.1 part of 3-methyl-1-butyn-3-ol. The resultant composition was cured and ground as described hereinabove for cured powder A to obtain the powder passing a 100-mesh sieve. This was designated cured powder C, and was pulverized using a mortar as easily as cured powder A.

Production of Cured Powder D 100 parts of a polyorganosiloxane resin containing 22 mol percent $(CH_3)_3SiO_{0.5}$ units, 68 mol percent $CH_3SiO_{1.5}$ units and 10 mol percent

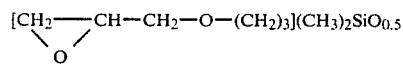
$[CH_2\text{---}CH\text{---}CH_2\text{---}O\text{---}(CH_2)_3](CH_3)_2SiO_{0.5}$
 \\_O_/ units was melt-blended at 100° C. with 10 parts of a phenol novolac resin exhibiting a softening point of 80° C. and a hydroxyl group equivalent weight of 100. One part of 2-methylimidazole was added, the temperature raised to 150° C. and the resultant mixture allowed to stand for 30 minutes. The final cured material could be relatively easily ground to a fine powder using a mortar. The cured material passing a 100-mesh sieve was designated as cured powder D.

Production of Cured Powder E (comparison example)

100 parts of a vinyl-terminated polyorganosiloxane of the average formula

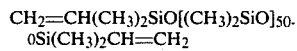
$CH_2=CH(CH_3)_2SiO[(CH_3)_2SiO]_{50}$-
$OSi(CH_3)_2CH=CH_2$ was blended to homogeneity with 0.5 part 2,5-dimethyl-2,5-di(t-butylperoxy)hexane and then press-vulcanized at 170° C. for 15 minutes. The rubbery cured product could not be ground up using a mortar, and was therefore ground using a pulverizer. The powder passing a 100-mesh sieve was designated as cured powder E.

Production of Cured Powder F (comparison example)

A polymethylsilsesquioxane produced by the hydrolysis/condensation of methyltrichlorosilane was pulverized and passed through a 100-mesh sieve to obtain cured powder material F.

EXAMPLE 1

30 parts of a phenol novolac resin having a softening point of 80° C. and a hydroxyl equivalent weight of 100 was kneaded with 6 parts cured powder A, 70 parts fused quartz powder, 4 parts hexamethylenetetramine and 1 part carnauba wax using a roll heated to 90° C. and then pulverized to yield a thermosetting phenol novolac resin composition of this invention.

This resin composition was transfer molded at 175° C. and 70 kg/cm² for 3 minutes and postcured at 150° C. for 2 hours. The properties of the resulting molding are reported in Table 1.

EXAMPLE 2

A thermosetting phenol novolac resin composition was prepared as described in Example 1 with the exception that 6 parts cured powder B were used instead of 6 parts cured powder A. The resulting resin composition of this invention was molded as described in Example 1. Various properties of the molding are reported in Table 1.

COMPARISON EXAMPLE 1

A thermosetting phenol novolac resin composition outside of the scope of this invention was prepared as described in Example 1, but omitting the 6 parts cured powder material A. The composition was then molded using the method of Example 1. Various properties of the molding are reported in Table 1.

COMPARISON EXAMPLE 2

A molding was produced as described in Example 1 using 6 parts of cured powder F in place of cured powder A. The various properties of the molding are reported in Table 1. The curable composition is outside the scope of the present invention due to use of a different polyorganosiloxane resin as cured powder F.

COMPARISON EXAMPLE 4

A molding of a thermosetting polyimide resin composition outside the scope of this invention was produced as described in Example 3 using 6 parts cured powder E in place of cured powder B. Various properties of this molding are reported in Table 2. Powder E is not within the scope of the present invention.

TABLE 2

| composition and properties | Example 3 | Comparison Example 3 | Comparison Example 4 |
| --- | --- | --- | --- |
| (a) polyimide resin (parts) | 30 | 30 | 30 |
| (b) cured powder material (parts) | | | |
| B | 6 | — | — |
| E | — | — | 6 |
| mold shrinkage (%) | 0.56 | 0.62 | 0.56 |
| shrinkage after postcuring (%) | 0.25 | 0.44 | 0.29 |
| flexural modulus (kg/mm²) | 930 | 1300 | 1000 |
| coefficient of thermal expansion ($\times 10^5$/°C.) | 1.5 | 1.7 | 1.5 |
| observations (voids) | none | — | yes |

EXAMPLE 4

20 parts of a cresol novolac epoxy resin exhibiting a softening point of 80° C. and an epoxy group equivalent weight of 220 were blended to homogeneity with 10 parts of the phenol novolac resin of Example 1, 10 parts cured powder material C, 70 parts fused silica, 0.4 parts carnauba wax and 0.1 part 2-methylimidazole using a hot roll at 90° C. The resulting curable composition was pulverized and subsequently transfer molded at 175° C.

TABLE 1

| composition and properties | Example 1 | Example 2 | Comparison Example 1 | Comparison Example 1 |
| --- | --- | --- | --- | --- |
| (a) phenol novolac resin (parts) | 30 | 30 | 30 | 30 |
| (b) cured powder material (parts) | | | | |
| A | 6 | — | — | — |
| B | — | 6 | — | — |
| F | — | — | — | 6 |
| mold shrinkage (%) | 0.07 | 0.06 | 0.26 | 0.27 |
| shrinkage after postcuring (%) | 0.12 | 0.11 | 0.19 | 0.17 |
| flexural modulus (kg/mm²) | 1090 | 1030 | 1470 | 1280 |
| coefficient of thermal expansion ($\times 10^5$/°C) | 0.3 | 0.3 | 1.3 | 1.0 |
| observations (voids) | none | none | — | yes |

EXAMPLE 3

30 parts of a thermosetting polyimide resin obtained under the designation BT2480 from Mitsubishi Gas Chemical Co., Ltd. were kneaded with 6 parts cured powder B, 70 parts fused quartz powder, 0.6 parts carnauba wax and 0.25 parts aluminum benzoate using a roll heated at 90° C., removed from the roll and then pulverized to prepare a thermosetting polyimide resin composition of this invention.

The composition was then transfer molded at 200° C. and 70 kg/cm² for 6 minutes and postcured at 230° C. for 3 hours. Various properties of the molding are reported in Table 2.

COMPARISON EXAMPLE 3

A molding of a thermosetting polyimide resin composition of the prior art was prepared as described in Example 3, but omitting the 6 parts of cured powder B. Various properties of the molding are reported in Table 2.

and 70 kg/cm² for 2 minutes and postcured at 180° C. for 12 hours. Various properties of the molding are reported in Table 3.

COMPARISON EXAMPLE 5

A prior art molding was produced using the composition and method described in Example 4, but omitting the 10 parts cured powder material C, and various properties were then measured. The results are reported in Table 3.

COMPARISON EXAMPLE 6

A molding was produced using the composition and the method described in Example 4, but substituting 10 parts cured powder E for the 10 parts of cured powder C. Various properties of the molding were measured and the results reported in Table 3. Cured powder E is outside the scope of this invention.

COMPARISON EXAMPLE 7

A molding was produced from a composition outside the scope of this invention using the method and composition described in Example 4 with 10 parts of cured powder material F instead of the 10 parts of cured powder C. Various properties of the molding are measured and the results are reported in Table 3.

TABLE 3

| composition and properties | Example 4 | Comparison Example 5 | Comparison Example 6 | Comparison Example 7 |
| --- | --- | --- | --- | --- |
| (a) phenol novolac (parts) epoxy resin | 20 | 20 | 20 | 20 |
| phenol novolac resin (parts) | 10 | 10 | 10 | 10 |
| (b) cured powder material (parts) | | | | |
| C | 10 | — | — | — |
| E | — | — | 10 | — |
| F | — | — | — | 10 |
| mold shrinkage (%) | 0.26 | 0.49 | 0.36 | 0.55 |
| shrinkage after postcuring (%) | 0.23 | 0.43 | 0.28 | 0.38 |
| flexural modulus (kg/mm$^2$) | 830 | 1370 | 930 | 900 |
| coefficient of thermal expansion ($\times$ 10$^5$/°C.) | 1.6 | 2.0 | 1.8 | 1.9 |

EXAMPLE 5

15 parts of a polymethylphenylsiloxane resin containing 40 mol percent $CH_3SiO_{1.5}$ units, 10 mol percent $C_6H_5(CH_3)SiO$ units, 40 mol percent $C_6H_5SiO_{1.5}$ units, 10 mol percent $(C_6H_5)_2SiO$ and 3 weight percent SiOH groups was blended with 15 parts of a cresol novolac epoxy resin exhibiting a softening point at 80° C. and an epoxy equivalent weight of 220, 6 parts cured powder D, 70 parts fused quartz powder, 0.07 parts aluminum trisacetylacetonate and 1 part carnauba wax using a roll heated to 90° C. The resultant curable silicone-epoxy composition of this invention was removed from the hot roll, pulverized, transfer molded at 175° C. and 70 kg/cm$^2$ for 2 minutes and then postcured at 180° C. for 12 hours. Various properties of the resulting molding are reported in Table 4.

COMPARISON EXAMPLE 8

A molding was produced by the method and composition described in Example 5, but omitting the 6 parts cured powder D. The properties of the molding are reported in Table 4. The curable composition was outside the scope of this invention due to the absence of a cured powder corresponding to ingredient (b).

TABLE 4

| composition and properties | Example 5 | Comparison Example 8 |
| --- | --- | --- |
| (a) silicone resin (parts) | 15 | 15 |
| epoxy resin (parts) | 15 | 15 |
| (b) cured powder material (parts) | | |
| D | 6 | — |
| mold shrinkage (%) | 0.31 | 0.52 |
| shrinkage after postcuring (%) | 0.23 | 0.49 |
| flexural modulus (kg/mm$^2$) | 1010 | 1420 |
| coefficient of thermal expansion ($\times$ 10$^5$/°C.) | 2.3 | 2.9 |
| observations (voids) | none | — |

That which is claimed is:

1. A thermosetting resin composition comprising (a) 100 parts by weight of a curable organic thermosetting resin, and (b) from 1 to 100 parts by weight of a finely divided, cured polyorganosiloxane resin wherein at least 90 weight percent of said polyorganosiloxane resin consists essentially of $R^1R^2R^3SiO_{0.5}$ units and $R^4SiO_{1.5}$ units and any remainder consists essentially of at least one member selected from the group consisting of $R^5R^6SiO$ units and $SiO_{4/2}$ units, where each of $R^1$, $R^2$, $R^3$, $R^4$, $R^5$, and $R^6$ repesents a hydrogen atom, a monovalent hydrocarbon radical, or a monovalent substituted hydrocarbon radical, and the molar ratio of $R^1R^2R^3SiO_{0.5}$ units to $R^4SiO_{0.5}$ units is from 0.1 to 3.

2. A composition according to claim 1 where the substituent present on said substituted hydrocarbon radical is selected from the group consisting of halogen, epoxy, glycidoxy, amino, hydroxyl, carboxyl, carboxylate ester and mercapto.

3. A composition according to claim 1 where $R^1$ through $R^6$, inclusive are individually selected from alkyl, fluoroalkyl, cycloalkyl, alkenyl and aryl radicals, and the average particle size of said polyorganosiloxane resin is less than 1 mm.

4. A composition according to claim 2 where $R^1$ through $R^6$, inclusive are individually selected from the group consisting of methyl, ethyl, vinyl, phenyl and 3-glycidoxypropyl, the average particle size of said polyorganosiloxane resin is less than 200 microns, and the composition includes a curing agent for said polyorganosiloxane resin.

5. A composition according to claim 4 where said polyorganosiloxane resin comprises $(CH_3)_3SiO_{0.5}$, $(CH_3)_2(CH_2=CHCH_2)SiO_{0.5}$, and $CH_3SiO_{1.5}$ units, the average particle size of the polyorganosiloxane resin is less than 200 microns, the thermosetting resin is selected from the group consisting of phenol novolac resins and polyimide resins, and said curing agent is a polyorganohydrogensiloxane.

6. A composition according to claim 5 where said polyorganosiloxane resin includes dimethylphenylsiloxy units.

7. A composition according to claim 5 where said polyorganosiloxane resin contains up to 10 weight percent of a polydiorganosiloxane.

8. A composition according to claim 4 where said polyorganosiloxane resin consists essentially of trimethylsiloxy, methylsiloxy andd dimethyl-3-glycidoxypropylsiloxy units and said composition contains an imidazole as a curing accelerator.

9. A composition according to claim 7 where said polydiorganosiloxane is a dimethylvinylsiloxy terminated polydimethylsiloxane.

10. A composition according to claim 1 where up to 10 percent by weight of said polyorganosiloxane resin is a block copolymer wherein the repeating units are derived from an organic resin and the repeating units of said polyorganosiloxane resin.

* * * * *